3,421,245
Patented Jan. 14, 1969

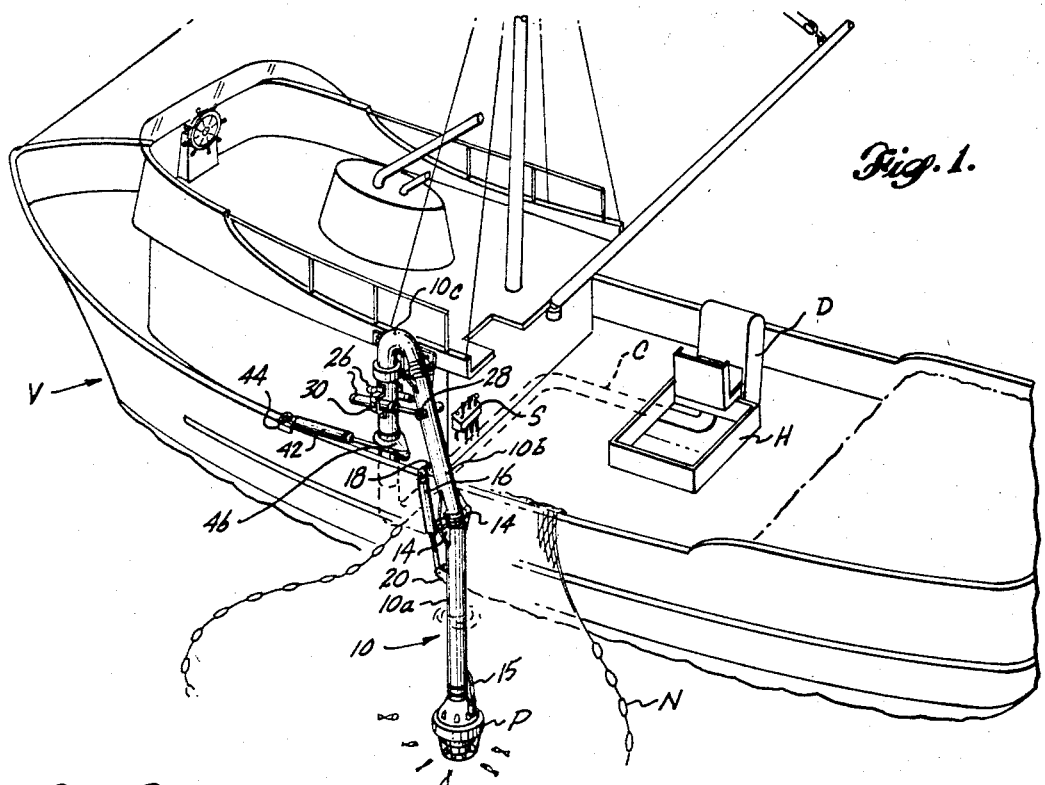

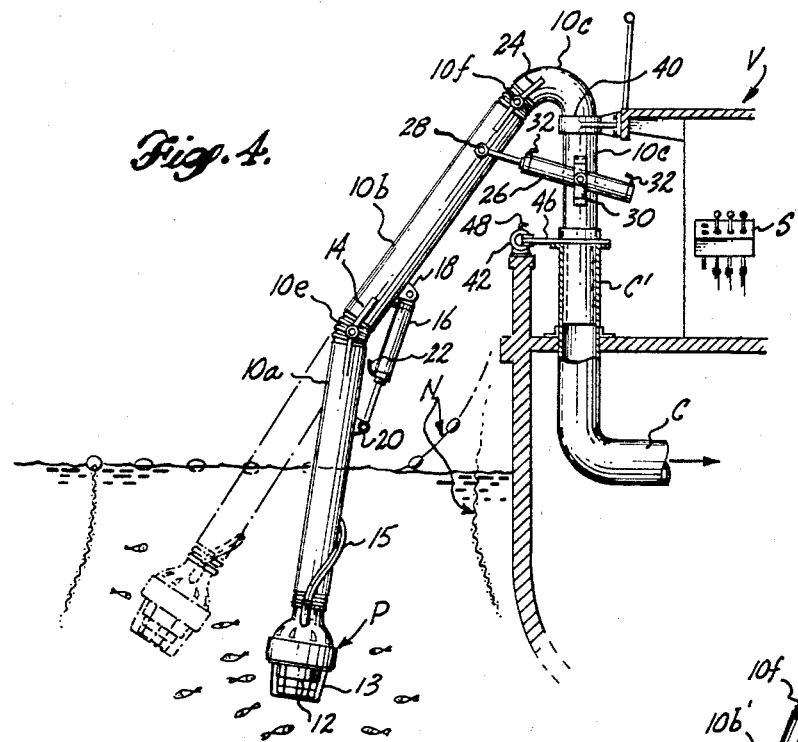

3,421,245
FISH PUMP SYSTEM WITH COMBINED ARTICULATED SUPPORT BOOM AND CONDUIT
David W. Lerch, Iquique, Chile, assignor to Marine Construction & Design Co., Seattle, Wash., a corporation of Washington
Filed Apr. 21, 1967, Ser. No. 632,622
U.S. Cl. 43—6.5     9 Claims
Int. Cl. A01k 79/00

ABSTRACT OF THE DISCLOSURE

Transfer of a fish and water mixture discharging from a submersible pump is effected through a tubular conduit made up of rigid segments successively interconnected by joints of a nature to permit controlled articulation movement between segments. Actuators interconnecting successive segments enable the conduit to function also as a structural boom-arm or support for the pump so as to permit moving the pump about as required either while operating or for purposes of extension and retraction between operating and stowed positions, respectively. The remote end of the boom-arm conduit is preferably mounted on a base support such as the deck of a fishing vessel so as to permit swinging of the structure about an upright axis, whereas vertical movements of the pump are preferably effectuated by actuator-controlled articulation movement of the segments relatively about generally horizontal axes. In one embodiment one or more member segments of the boom-arm conduit are of telescoping construction permitting the pump to be thrust deeper into the water when necessary without changing relative angular positioning of the segments.

---

This invention relates to an improved fish pumping system and more particularly to an improved means for positioning and maneuvering a submersible fish pump from a fishing vessel or other supporting base structure while conveying or transferring the discharge of the pump to a selected point of disposal. The invention is herein illustratively described by reference to the presently preferred embodiments thereof; however, it will be recognized that certain modifications and changes therein with respect to details may be made without departing from the essential features involved.

Under commercial fishing conditions in heavy seas pendulous suspension of a heavy and bulky object such as a submersible fish pump on the end of a line can present difficulty in safely and accurately controlling the position and the movement of the pump, both during pumping operations and when lowering the pump into the water or raising it for stowage on the vessel. When lowered materially below the surface of the water, as during net bailing, it is sometimes difficult or impossible to see the pump and thereby reliably determine its depth, except by observing and subtracting the remaining on-deck length of fish pump hose. Further, the provision in prior systems of a conduit or hose separate from the means of support and locomotion for the pump resulted in the requirement for providing, operating and maintaining two sets of gear; also in their occupancy of valuable deck space which could better serve other purposes both during pumping operations and with the system in stowage.

With the above considerations in view it is therefore an object of this invetnion to provide a safer, more easily, positively, and reliably controlled, more compact and more quickly extensible, maneuverable and retractable submersible fish pump system than has been available heretofore.

A related object is to devise a submersible fish pump system including combined conduit, support and locomotion means for the pump which will occupy only a minimum of valuable deck space aboard the fishing vessel or other structure, both in the extended or operating position as well as in the stowed position of the system. The invention thus eliminates the necessity for a separate conduit or hose requiring separate manipulation, protection, replacement or repair and physical disposal in operation as well as in stowage.

A further object is to simplify and reduce the apparatus and gear requirements of a fish pumping system.

A general object is to achieve the unique advantages set forth above without limitation as to the conduit size or capacity requirement of a system.

With these and related objects in view, certain features of the invention reside in the provision of an articulated elongated boom-arm of tubular conduit form which at one end is connected to the submersible fish pump both to receive its discharge and to support the pump physically, and which at its opposite end is connected to a suitable supporting base, such boom-arm conduit comprising a plurality of substantially rigid tubular members serially interconnected by articulated joint means and provided with actuators for controlling relative angular positioning and movement between successively connected members. The supporting base operatively associated with one of the tubular members is preferably mounted on the boat or other structure so as to permit swinging of the conduit-boom system as a whole about an upright axis, and the articulation joints between successively connected tubular members, to constrain them to relative motion in vertical planes. Preferably the actuators comprise hydraulic jacks which may be independently controlled from a hydraulic console station, as may be the pump itself and the means for swinging the structure as a whole upon its supporting base.

According to a further feature of the invention, one of the tubular members comprising the combined conduit and boom-arm support for the pump, is of compactly stowable telescoping construction which enables the operator to thrust the pump deeper or farther outboard into the fish net or other submerged location and readily observe its depth by relating it to the relative position of exposed parts of the boom.

A related feature is the combination with such a positioning and transfer system of a submersible fish pump fixedly mounted on the endmost tubular conduit member so that the operator may vary and observe at will not only the depth, but also the angular orientation or attitude of the pump, though the latter is out of sight in the water.

With this improved system of support and transfer capability, movements of the vessel are matched by movements of the pump or may be controlled independently thereof if desired, either by a human or by an automatic servo system of suitable or conventional form if desired. For stowage the boom-mounted pump may be swung upwardly and laterally over the side to a convenient position where it will be out of the way and, if preferred, off the deck, and there be safely maintained without danger of damage to itself or to the vessel or crew. The former problem of abrasion and wear of separate fish pump hoses, requiring expensive replacements or repairs is also avoided.

These and other features, objects and advantages of the invention will become more fully evident from the following description thereof by reference to the accompanying drawings.

FIGURE 1 is a simplified perspective view of a fishing vessel incorporating the invention in one embodiment, with the pump shown submerged in operating position in a fish net.

FIGURE 2 is a simplfied perspective view corresponding to that in FIGURE 1 with the pump now raised and swung inboard to a position of stowage.

FIGURE 3 is a top view showing a side portion of the vessel with the pump and supporting conduit system installed thereon, and illustrating by solid lines extending abeam and by broken lines extending abaft and forward the maneuverability of the pump and functionally supportive apparatus in horizontal planes.

FIGURE 4 is a simplified transverse sectional view of a fishing vessel with the improved pump system installed thereon and illustrating the convenience with which the pump may be maneuvered in vertical planes.

FIGURE 5 is a view corresponding to FIGURE 4 illustrating a modified boom-arm conduit in which the end member is of telescoping construction.

FIGURE 6 is a perspective view of the vessel with the system shown in FIGURE 5 and the pump now positioned in stowage.

Referring now to FIGURES 1–4 inclusive, the fishing vessel V shown for purposes of illustration comprises a suitable hold to which access is gained through a hatch H in order to dump fish being pumped upwardly by the submersible pump unit P from the enclosure of fish net N. Typically this pumping operation occurs during the drying-up phase of purse seining when the net is drawn into a tight purse alongside the vessel. Various means are available for the purpose of separating the fish from water before the fish are deposited into the hold. In the example this is accomplished by a fish dewatering device D stationed adjacent the hatch H and to which the pumped stream of fish and water are delivered through a conduit C. Water separated from fish in unit D runs directly overboard as the fish pour into the hold. The details of this portion of the installation are or may be conventional and are of no direct significance to the present invention. They are therefore omitted from the illustration and from this description.

The present invention is concerned with the means by which to convey or transfer the fish from a maneuverable and submersible pump P to a suitable point of disposal such as the conduit C while affording a means to support the pump and move it about in the required manner consistent with the above-stated objectives. As depicted, the novel system comprises an elongated tubular fish transfer conduit 10 functioning also as a controllable boom, such conduit having successively interconnected rigid tubular members 10a, 10b and 10c. Preferably member 10c is formed as an over-arched elbow section extending upwardly from a straight vertical section. Pump P is preferably of the axial flow type having axially directed inlet 12 covered by a guard screen 13 and an oppositely directed outlet at which it is joined to the endmost tubular member 10a in a coaxial alignment therewith. Of the rotary impeller type, pump P is preferably driven by a hydraulic motor contained in the same outer housing with the impeller and energized through flexible hydraulic supply and return lines 15 supported extending along the conduit 10 to the hydraulic pressure source and system including the control console at station S. An operator may thus position himself at station S conveniently located for observing the pump, and manipulate suitable hydraulic control valves (not shown) in order to operate the pump and maneuver the conduit boom-arm system being described. Being rigidly mounted on the tubular member 10a, the angular orientation or attitude of the pump P as well as its depth in the water may be determined by the operator at all times simply by observing the position of conduit segment 10a.

Conduit sections 10a and 10b are interconnected for flow transfer purposes by flexible tubular bellows 10e which may be of rubber or other suitable material. These connecting bellows or equivalent articulative tubular connecting means between rigid conduit members may be designed to perform a mechanical supporting function if desired, but in the example they need not be. Mechanical load transfer in this case is provided by separate hinge means 14 including similar pairs of hinge arms welded or otherwise joined to the respective conduit members 10a and 10b at respectively opposite sides of the latter. The hinge means 14 constrains the tubular members 10a and 10b to swing relatively about a transverse horizontal axis while preventing their relative angular movement about other axes. A remotely controllable hydraulic jack 16 connected at one end by a fitting 18 to tubular member 10b adjacent the articulation joint and at its opposite end by fitting 20 to the tubular member 10a also adjacent such joint is operated through flexible hose means 22 (not fully shown) from console station S in a suitable or conventional manner so as to swing the members relatively in either direction. Tubular members 10b and 10c are provided with a similar articulated joint connection means including the flexible bellows member 10f and the hinge means 24 so as to permit these tubular members and hinge means 24 to be flexed relatively about the transverse horizontal axis defined by the hinge means 24. Likewise relative angular positioning of the members 10b and 10c is accomplished by a pair of conjointed operable hydraulic jacks 26 having one element connected to the tubular member 10b through fittings 28 and their opposed elements connected to the tubular member 10c. Hydraulic hose means 32 connecting the jacks to valves (not shown) at the control station S enable the operator to swing the tubular member 10b and thereby the member 10a and pump P about the axis of hinge means 24 independently of the relative angular position established between tubular members 10a and 10b by the actuator jack 16.

For purposes of the instant embodiment two transverse-axis articulation joints are required. It will be evident, however, that the number used in a system may vary with design requirements or choice.

The vertically extending lower section of conduit member 10c is slidably and rotatably received in an upwardly directed extension of conduit C′ so as to permit member 10c to turn about an upright axis. A journal bracket 40 provides additional rotational support for tubular member 10c at a higher location thereon. A hydraulic jack 42 is connected at one end to a suitable stationary point on the vessel such as by means of a rail-mounted fitting 44 and to a lever arm 46 rigidly mounted on the member 10c so as to permit swinging of this member, hence of the entire conduit system and pump about a vertical axis. Jack 42 like the others has hose means 48 extending to suitable controls at station S. FIGURE 3 depicts the range of horizontal swing of the boom-conduit-pump system which may be effectuated by hydraulic jack 42. Obviously alternative arrangemnts may be used for actuating the boom structure about its vertical support axis if desired.

In FIGURE 2 the parts are relatively disposed to illustrate a convenient stowage position for the submersible fish pump P and conduit-boom off the deck. In this case the pump has been raised upwardly and swung inboard to a stationary elevated position overlying the deck or rail, where the apparatus does not occupy or interfere with use of deck space on the vessel and wherein the position of all parts may be safely determined and controlled from a single station.

In the modified embodiment shown in FIGURE 5 parts which correspond to those in FIGURES 1–4 inclusive bear similar reference characters. In this instance tubular members 10a and 10b are combined into a single member 10b' which is of variable-length telescoping construction and which eliminates the articulation joint comprising the bellows member 10e and hinges means 14 of the preceding embodiment. Tubular member 10b' comprises an upper section 10b'1, an intermediate section 10b'2 telescopingly slidable within it, and an endmost or lower section 10b'3 which slides telescopingly within the intermediate section as shown. When the pump, mounted on section 10b'3 as it was on member 10a in the first embodiment, is swung laterally outboard and the tubular member 10b' is swung downward on the axis of hinges 24, the combined weight of the pump and pipe sections 10b'2 and 10b'3 causes telescopic extension of the conduit member 10b'. Furthermore, when the pump is submerged in the water in this downwardly directed attitude of the conduit supporting it, operation of the pump sucking water and fish upwardly into its inlet produces a downwardly directed thrust of propulsion in the water tending to work the pump deeper in the water and thereby aids in the telescopic extension of tubular member 10b'. Limit stops (not shown) establish the limits of relative extension movement of the sections 10b'1, 10b'2 and 10b'3. It is not necessary to have the sliding or bearing surfaces of these sections tightly sealed against loss of water under pressure from the pump because the system is not dependent upon a a sealed line for its operation. In fact, leakage of water at the joint connections can have a beneficial effect in helping to dewater the fish enroute to the dewatering device D.

In order to retract the section 10b'2 into the section 10b'1 and the section 10b'3 into the section 10b'2 so as to vary the length of member 10b', a single actuator may be employed. In this instance it comprises a hydraulic jack 50 having its upper end mounted on the side of the tubular member section 10b'1 and its lower end carrying a multiple sheave block 52, the mate of which, 54, is mounted at a lower point on the section 10b'1. A line 56 connected at its lower end at 56a to the pump P and at its upper end to a suitable point (not shown) on the side of the section 10b'1 serially enwraps successive sheaves or pulleys alternately located on the multiple sheave blocks 52 and 54 so as to serve as a motion multiplier of a usual type, such that for a given longitudinal displacement of the sheave block 52 by operation of the jack 50 a multiplied degree of motion in the line 56 is achieved for telescopingly contracting the conduit member 10b'. Thus if the extended length of member 10b' is twenty feet greater than its retracted length and hydraulic jack has a four foot stroke a motion multiplication factor of 5 will be necessary in order to shorten members 10b' to its minimum length for stowage (FIGURE 6) or maximum decrease of water depth of the pump during operation (FIGURE 5). It will be evident that this embodiment if desired may make use of other types of motion multipliers or other means for effecting retraction and extension of the tubular conduit member 10b', hence of pump P.

In operation the embodiment of FIGURE 5 permits extension and retraction of the pump unit to varying depths in the water without changing the angular relationship between the tubular members 10b' and 10c. Likewise for compact stowage purposes conduit member 10b' may be fully contracted when the boom-arm conduit is swung upwardly and inboard to rest on a supporting bracket 60 mounted on the side of the cabin.

These and other aspects of the invention will be evident to those skilled in the art having reference to the foregoing description of the presently preferred embodiment.

What is claimed is:

1. In combination with a submersible fish pump having an ambiently open inlet, and outlet, and means for operating the pump while submerged so as to produce a positive pressure discharge through the outlet, an articulated elongated boom-arm of tubular conduit form having one end thereof supportingly connected to the pump by its outlet so as to receive the pump's discharge and comprising a plurality of substantially rigid tubular members serially interconnected by articulated joint means providing both a flow connection between members and a physical supporting joint one member for the next while permitting relative angular movement therebetween, actuator means interconnecting the tubular members so joined and operable to selectively vary the angular relationship between successive members, base means supportingly connected to one of the tubular members and thereby supportingly connected to the pump through the intervening tubular members, and means to selectively move said one tubular member and thereby the boom-arm as a whole relative to said base means.

2. The combination defined in claim 1, wherein at least one of the tubular members is variable in length, comprising telescopically interfitted tubular elements, and actuating means interconnecting such elements and operable thereby to vary the length of such latter tubular member.

3. The combination defined in claim 1, wherein the pump's inlet and outlet are aligned and the pump is joined to the endmost adjacent tubular member in substantially fixed alignment of the pump's inlet and outlet therewith.

4. The combination defined in claim 1, wherein the tubular member adjacent to the pump is of adjustable length, comprising elements in telescopically extensible and contractable relationship, and remotely controlled actuator means interconnecting such elements and operable thereby to vary the length of the latter tubular member.

5. The combination defined in claim 1, wherein the base means comprises an upright conduit element connected with the endmost tubular member remote from the pump and itself mounted to be turned on an upright axis, and said combination further comprising actuator means to turn such upright conduit element and with it thereby the boom-arm.

6. The combination defined in claim 5, wherein the joints and actuating means interconnecting the tubular members constrain the same to movement substantially in upright planes.

7. Apparatus for fish-net brailing and like operations comprising a submersible fish pump, an elongated rigid conduit connected at one end to the fish pump to receive the latter's discharge and stationarily mounted at its opposite end to direct the pump's discharge, said conduit being segmented and having articulation joints interconnecting the segments, and remotely-controlled power-operated actuation means interconnecting the segments so as to permit selectively controlled articulation movement of the conduit and thereby movement of the pump into and from operating position.

8. The apparatus defined in claim 7, wherein the actuation means comprises, at each such joint between segments, an extensible and contractable hydraulic jack having opposite ends connected to the respective segments.

9. In a system for the accumulation and transfer of fish, including a supporting structure having a deck and adjacent side, a fish-receiving conduit mounted in upright position relative to the deck, an elongated multi-segment rigid tubular transfer conduit having articulation joints between segments and connected at one end to the fish-receiving conduit, a submersible fish pump operable in an underwater concentration of fish and connected to the opposite end of said transfer conduit, the connection permitting swinging and articulative flexural movement of the tubular conduit so as to carry the pump between upraised position for storage over the deck and any of various selected operating positions lowered over the side into the water, remotely controlled actuator means respectively interconnecting the successive conduit segments, and means for selectively operating said actuator means so as to vary the angular set between segments in vertical planes whereby to move the pump in and out and up and down.

References Cited
UNITED STATES PATENTS

| | | | |
|---|---|---|---|
| 1,361,691 | 12/1920 | Davis | 43—6.5 |
| 2,736,121 | 2/1956 | Kimmerle | 43—6.5 |
| 3,314,184 | 4/1967 | Lerch | 43—6.5 X |

WARNER H. CAMP, *Primary Examiner.*